United States Patent
Suzuki (10) Patent No.: US 7,973,452 B2
(45) Date of Patent: Jul. 5, 2011

(54) VIBRATION ACTUATOR

(75) Inventor: Kodai Suzuki, Aichi (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 12/445,058

(22) PCT Filed: Aug. 30, 2007

(86) PCT No.: PCT/JP2007/066905
§ 371 (c)(1),
(2), (4) Date: Nov. 6, 2009

(87) PCT Pub. No.: WO2008/044396
PCT Pub. Date: Apr. 17, 2008

(65) Prior Publication Data
US 2010/0084944 A1 Apr. 8, 2010

(30) Foreign Application Priority Data
Oct. 13, 2006 (JP) ................................ 2006-280258

(51) Int. Cl.
*H02N 2/00* (2006.01)
(52) U.S. Cl. ......... 310/323.14; 310/323.08; 310/323.09; 310/323.17
(58) Field of Classification Search ............. 310/323.01, 310/323.02, 323.04, 323.05, 323.08, 323.09, 310/323.13, 323.14, 323.17, 328
See application file for complete search history.

(56) References Cited

U.S. PATENT DOCUMENTS

| 5,872,417 | A * | 2/1999 | Sugaya | 310/323.17 |
|---|---|---|---|---|
| 6,384,515 | B1 * | 5/2002 | Ganor et al. | 310/328 |
| 6,404,104 | B1 * | 6/2002 | Maeno et al. | 310/323.02 |
| 6,664,710 | B1 * | 12/2003 | Gottlieb et al. | 310/323.02 |
| 6,849,989 | B2 * | 2/2005 | Schmid et al. | 310/328 |
| 7,459,834 | B2 * | 12/2008 | Knowles et al. | 310/328 |
| 7,683,523 | B2 * | 3/2010 | Adachi | 310/323.13 |
| 2009/0039734 | A1 * | 2/2009 | Takahashi et al. | 310/323.02 |
| 2009/0267455 | A1 * | 10/2009 | Takasan et al. | 310/323.16 |

FOREIGN PATENT DOCUMENTS

| JP | 11-220892 A | | 8/1999 |
|---|---|---|---|
| JP | 2004-312810 A | | 11/2004 |
| JP | 2007-135270 A | * | 5/2007 |
| JP | 2008-72803 A | * | 3/2008 |

OTHER PUBLICATIONS

Korean Official Action No. 2009-7007619, dated Oct. 14, 2010.
International Search Report issued Oct. 9, 2007, for International Application No. PCT/JP2007/066905.

* cited by examiner

*Primary Examiner* — Thomas M Dougherty
(74) *Attorney, Agent, or Firm* — Locke Lord Bissell & Liddell LLP

(57) ABSTRACT

A vibrator (3) is sandwiched between a base block (1) and a stator (2), and a substantially lower half of a substantially spherical rotor (6) is received in a recess (5) of the stator (2). A support member (7) is placed on an upper portion of the stator (2). A preload portion (10) is supported at an end of an angle portion (9) of the support member (7). A spherical member (11) rotatable about multiple axes of the preload portion (10) abuts against a top portion of the rotor (6) to apply a preload to the rotor (6). Driving the vibrator (3) rotates the rotor (6), whereby an output shaft (12) is moved between the preload portion (10) and an annular portion (8) of the support member (7) as a movable range.

13 Claims, 12 Drawing Sheets

VIBRATION ACTUATOR

TECHNICAL FIELD

The present invention relates to a vibration actuator, and more particularly, to a vibration actuator that generates ultrasonic vibrations in a stator to rotate a spherical rotor.

BACKGROUND ART

In recent years, a vibration actuator that rotates a rotor utilizing ultrasonic vibrations has been proposed and put into practical use. The vibration actuator generates elliptic motion or traveling waves on the surface of the stator using a piezoelectric element, and brings the stator in pressure contact with the rotor, to thereby move the rotor through the intermediation of a frictional force therebetween.

For example, Patent Document 1 discloses an actuator in which a spherical rotor is preloaded by a plurality of elastic bodies through bearings to bring the rotor in pressure contact with the stator, and in this state, a drive voltage is applied to a plurality of piezoelectric element plates that are superimposed on one another to generate ultrasonic vibrations in the stator, thereby rotating the rotor. Herein, "preload" refers to a pressure by which the rotor is pressed toward the stator in a state where at least the piezoelectric element is not energized.
Patent Document 1: JP 2004-312810 A

DISCLOSURE OF THE INVENTION

Problems to be Solved by the Invention

However, the actuator in Patent Document 1 rotatably supports a rotating shaft serving as an output shaft of the rotor about the shaft by the bearing, and rotates a weight attached to the end of the rotating shaft. The rotor is moved within a range of inclined angle if the rotating shaft is inclined, but the movable range of the rotor is extremely narrow.

For example, although an annular preload portion may abut against the rotor and preload the rotor, thereby making it possible to extend the output shaft of the rotor to the outside through the ring of the preload portion, even in such a case, it is difficult to increase the movable range of the rotor under the constraint of the annular preload portion. Further, if the ring of the preload portion is set to be larger in order to widen the movable range, there is a risk that the annular preload portion will slip out over the spherical rotor in response to the preload.

Also, if the preload portion and the stator are formed as separate mechanisms, the movable range of the rotor can be increased, but there arises such a problem that the entire dimensions increase.

The present invention has been made to solve the above-mentioned problems, and therefore an object of the present invention is to provide a vibration actuator which is capable of ensuring a wide movable range without the preload portion slipping out over the rotor while controlling increases in size due to the preload mechanical portion.

Means for Solving the Problems

A vibration actuator according to the present invention comprises: a stator; a rotor of a substantially spherical shape which is disposed on the stator; preload means for bringing the rotor into pressure contact with the stator; and vibrating means for generating ultrasonic vibrations in the stator so as to rotate the rotor, wherein: the rotor comprises a functional component; the preload means comprises a preload portion that abuts against a top portion of the rotor and preloads the top portion; and the functional component of the rotor is moved between the preload portion and the stator as a movable range.

The preload portion of the preload means abuts against the top portion of the rotor to apply a preload to the rotor, and the output shaft of the rotor is moved between the preload portion and the stator as the movable range. Here, the top portion of the rotor refers to a surface portion of the rotor opposite to the stator on a line of action of a normal force that is exerted on the rotor from the stator, that is, a portion of a predetermined area including the portion of the rotor which is farthest from a portion that abuts against the stator.

Effect of the Invention

According to the present invention, it is possible to ensure a wide movable range without the preload portion slipping out over the rotor while controlling increases in size due to the preload mechanical portion.

BEST MODES FOR CARRYING OUT THE INVENTION

Hereinafter, description is given of embodiments of the present invention with reference to the attached drawings.

First Embodiment

Figure 1:
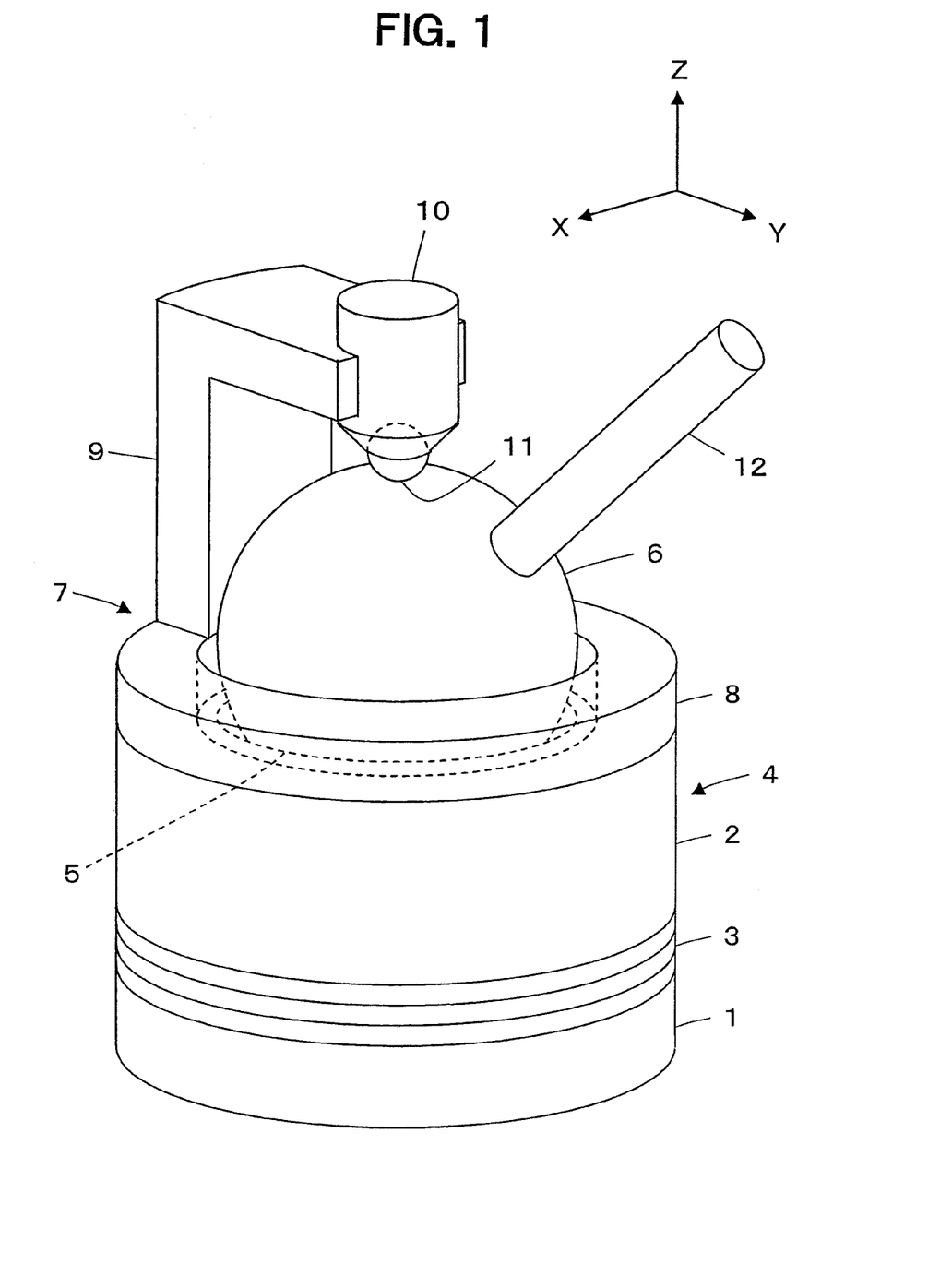
FIG. 1 is a perspective view illustrating a vibration actuator according to a first embodiment of the present invention.

FIG. 1 illustrates a vibration actuator according to a first embodiment of the present invention. A vibrator 3 that constitutes vibrating means is sandwiched between a base block 1 and a stator 2, and those members form a main body 4 having a substantially cylindrical contour. A recess 5 is formed in the stator 2 on a surface opposite to a surface in contact with the vibrator 3, and substantially the lower half of a substantially spherical rotor 6 is received in the recess 5.

A support member 7 is arranged on an upper portion of the stator 2. The support member 7 has an annular portion 8 fixed onto a top surface of the stator 2, and a reverse L-shaped angle portion (cantilever portion) 9 that extends upward from the annular portion 8. A preload portion 10 is supported at an end of the angle portion 9. The preload portion 10 has a spherical member 11 rotatable about multiple axes, and the spherical member 11 is so arranged as to abut against the top portion of the rotor 6. Also, an output shaft 12 is coupled with and fixed to the rotor 6 as a functional component. The output shaft 12 has a movable range between the preload portion 10 and the stator 2.

Here, for convenience of description, a center axis of the main body 4 extending from the base block 1 toward the stator 2 is defined as the Z-axis, an X-axis extends in a direction perpendicular to the Z-axis, and a Y-axis extends perpendicularly to the Z-axis and the X-axis.

The spherical member 11 of the preload portion 10 is in contact with the top portion serving as a vertex of the rotor 6 in the +Z axial direction. The angle portion 9 of the support member 7 has elasticity with which the spherical member 11 is brought into pressure contact with the rotor 6, and the rotor 6 is preloaded in the −Z axial direction. The preload does not have to be imparted at the precise top of the rotor 6, and the spherical member 11 may be in contact with the surface of the rotor 6 within a predetermined area including the top of the rotor 6 for the preload.

Figure 2:
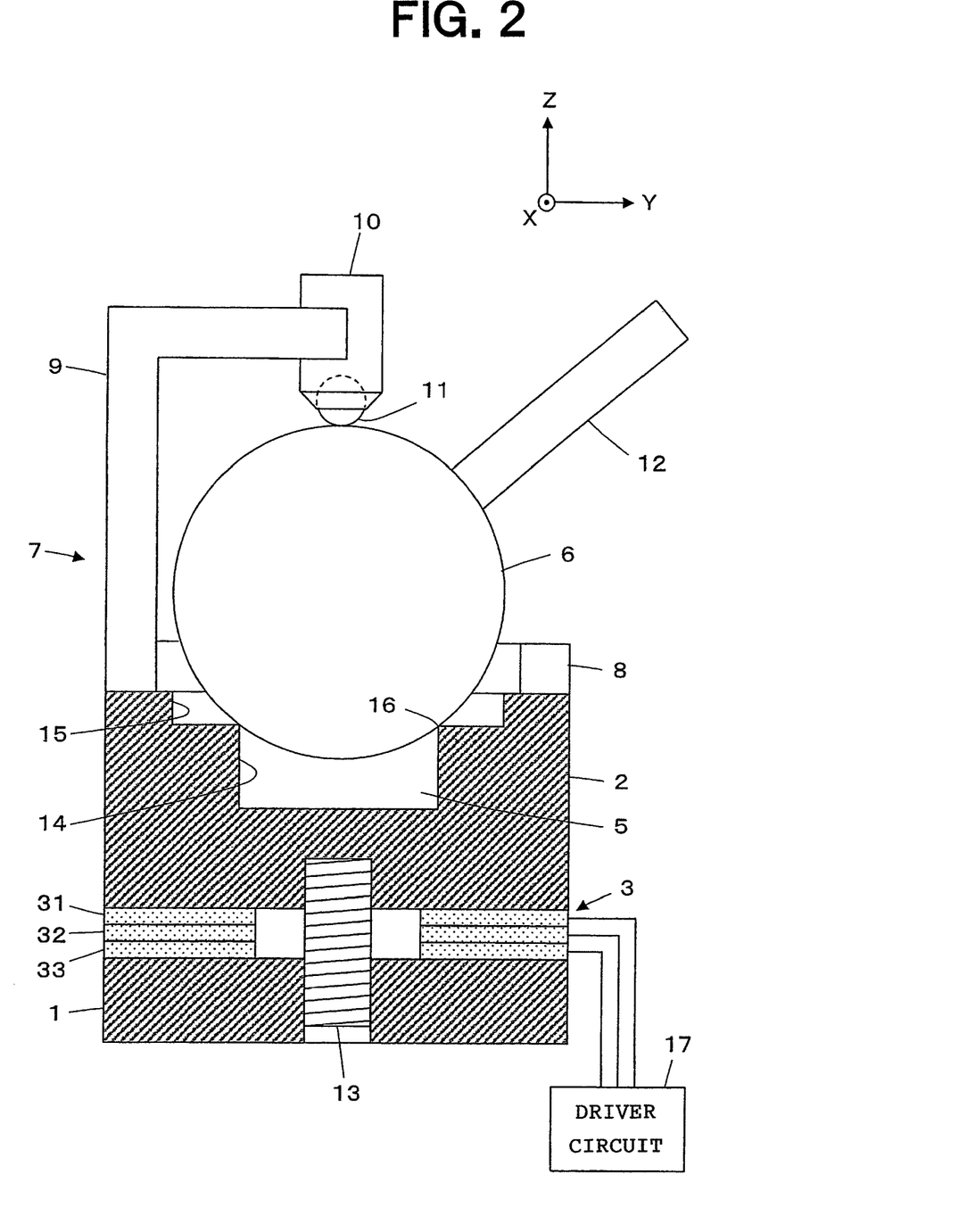
FIG. 2 is a cross-sectional view illustrating the vibration actuator according to the first embodiment.

As illustrated in FIG. 2, the base block 1 and the stator 2 are coupled to each other through the intermediation of a coupling bolt 13 that passes through the vibrator 3.

The recess 5 of the stator 2 includes a small-diameter portion 14 having an inner diameter smaller than the diameter of the rotor 6, and a large-diameter portion 15 having an inner diameter larger than the diameter of the rotor 6, and an annular step 16 positioned on an X-Y plane is formed at the boundary between the small-diameter portion 14 and the large-diameter portion 15. The rotor 6 is rotatably supported while abutting against the step 16 inside of the recess 5.

The base block 1 and the stator 2 are made respectively of, for example, duralumin, and the rotor 6 is formed of a steel sphere.

The vibrator 3 generates ultrasonic vibrations in the stator 2 to rotate the rotor 6 about the three axes of X, Y, and Z. The vibrator 3 has first to third piezoelectric element portions 31 to 33. The first to third piezoelectric element portions 31 to 33 are positioned respectively on the X-Y plane and superimposed on one another. Those first to third piezoelectric element portions 31 to 33 are electrically connected to a driver circuit 17.

Figure 3:
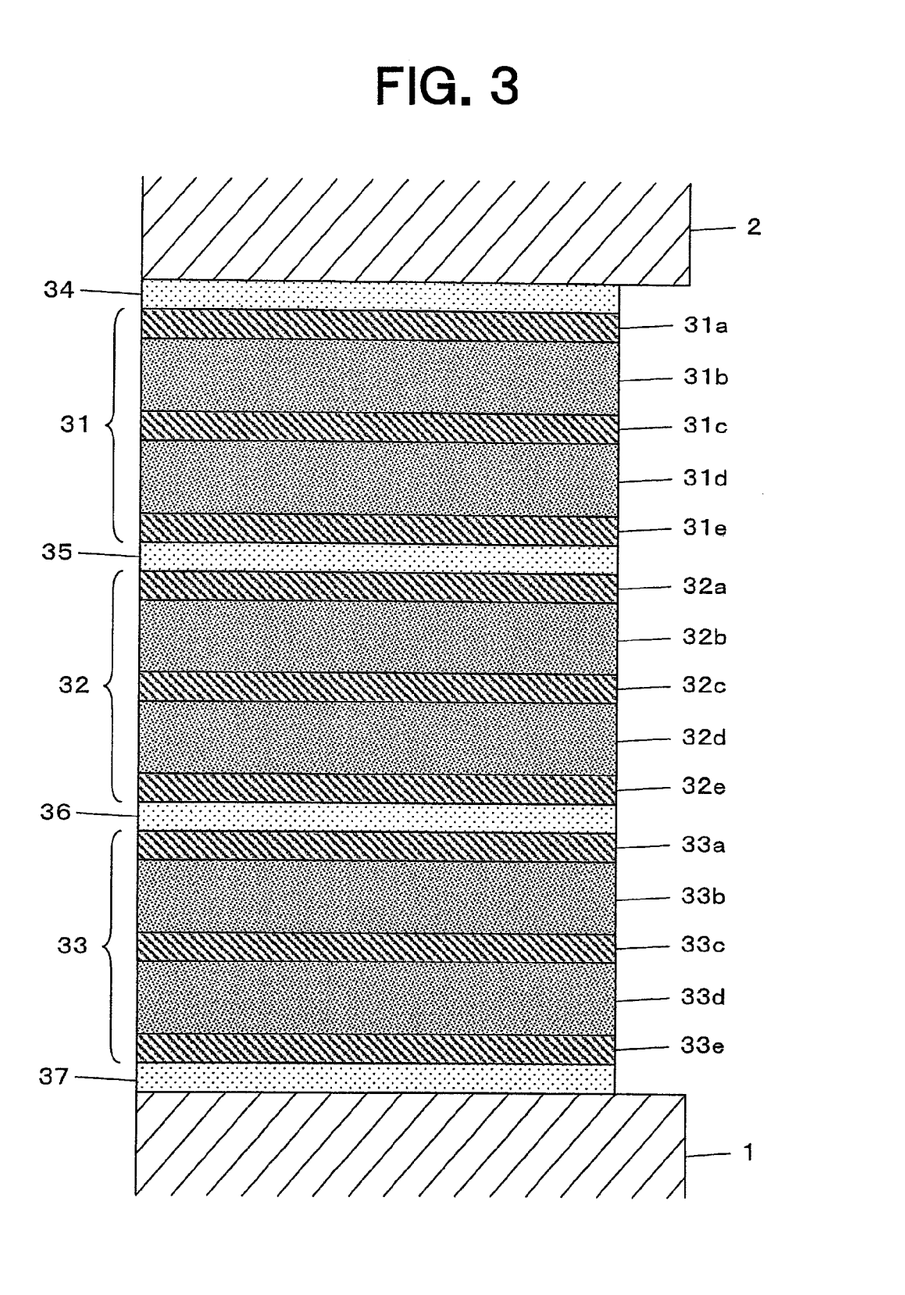
FIG. 3 is a partial cross-sectional view illustrating a construction of a vibrator used in the first embodiment.

Specifically, as illustrated in FIG. 3, the first piezoelectric element portion 31 has a structure in which an electrode plate 31a, a piezoelectric element plate 31b, an electrode plate 31c, a piezoelectric element plate 31d, and an electrode plate 31e each having a disk shape are superimposed on one another in this order. Likewise, the second piezoelectric element portion 32 has a structure in which an electrode plate 32a, a piezoelectric element plate 32b, an electrode plate 32c, a piezoelectric element plate 32d, and an electrode plate 32e each having a disk shape are sequentially superimposed on one another in this order. The third piezoelectric element portion 33 has a structure in which an electrode plate 33a, a piezoelectric element plate 33b, an electrode plate 33c, a piezoelectric element plate 33d, and an electrode plate 33e each having a disk shape are sequentially superimposed on one another in this order. These piezoelectric element portions 31 to 33 are arranged in such a state that the piezoelectric element portions 31 to 33 are insulated from the stator 2, from the base block 1 and from each other, through the intermediation of insulating sheets 34 to 37.

Figure 4:
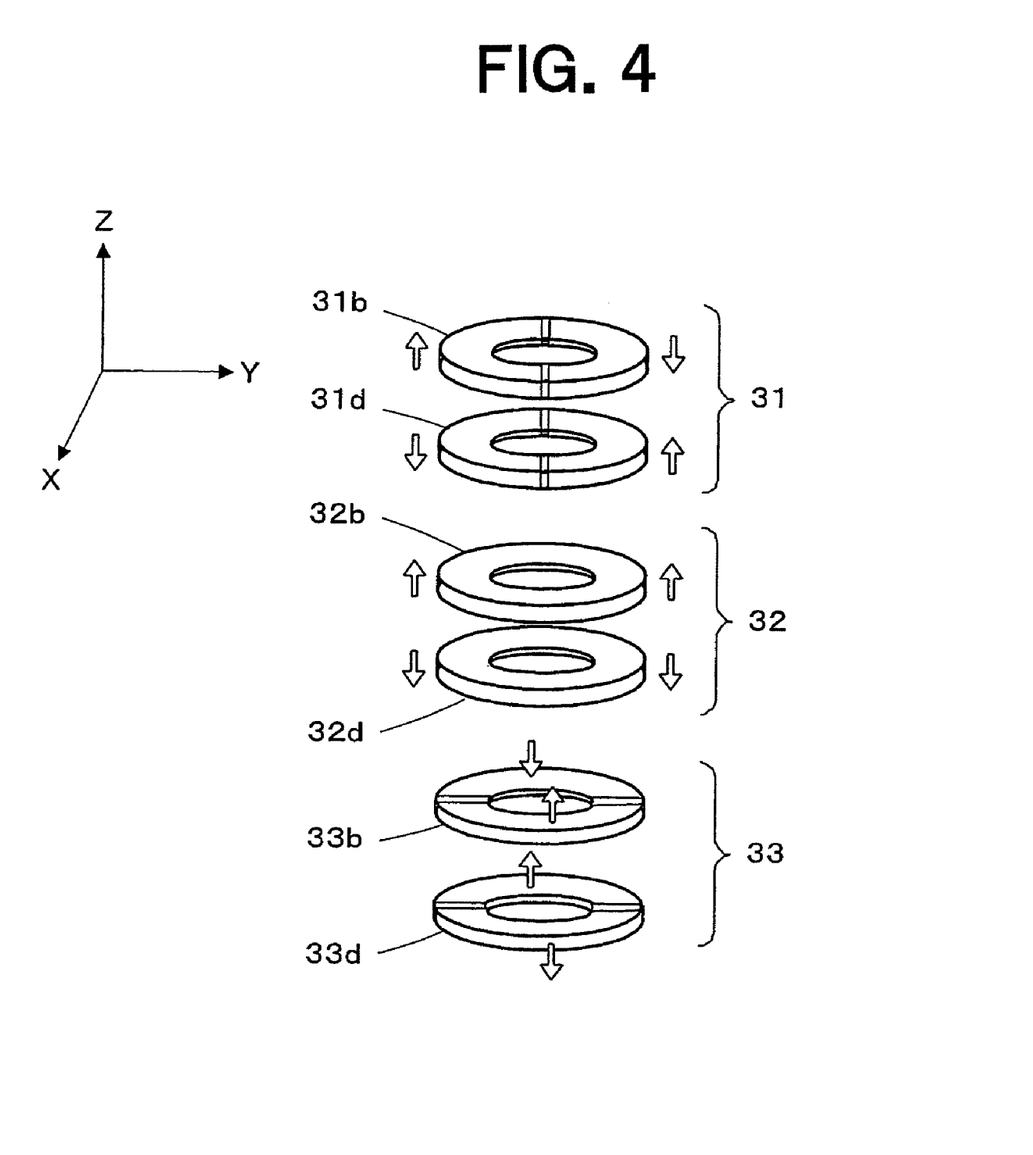
FIG. 4 is a perspective view illustrating a polarization direction of three pairs of piezoelectric element plates of the vibrator used in the first embodiment.

As illustrated in FIG. 4, both of the pair of piezoelectric element plates 31b and 31d of the first piezoelectric element portion 31 are divided in the Y-axis direction into two portions of opposite polarities; they are polarized so as to perform the opposite deformation behaviors of expansion and contraction in the Z-axis direction (thickness direction), with the piezoelectric element plates 31b and 31d being arranged so as to be reversed with respect to each other.

Neither of the pair of piezoelectric element plates 32b and 32d of the second piezoelectric element portion 32 are divided into two portions; they are polarized so as to perform as a whole the deformation behavior of expansion or contraction in the Z-axis direction (thickness direction), with the piezoelectric element plates 32b and 32d being arranged so as to be reversed with respect to each other.

Both of the pair of piezoelectric element plates 33b and 33d of the third piezoelectric element portion 33 are divided in the X-axis direction into two portions of opposite polarities; they are polarized so as to perform the opposite deformation behaviors of expansion and contraction in the Z-axis direction (the thickness direction), with the piezoelectric element plates 33b and 33d being arranged so as to be reversed with respect to each other.

The electrode plate 31a and the electrode plate 31e which are arranged on respective opposite surface portions of the first piezoelectric element portion 31, the electrode plate 32a and the electrode plate 32e which are arranged on respective opposite surface portions of the second piezoelectric element portion 32, and the electrode plate 33a and the electrode plate 33e which are arranged on respective opposite surface portions of the third piezoelectric element portion 33 are electrically grounded. Also, the electrode plate 31c arranged between the pair of piezoelectric element plates 31b and 31d of the first piezoelectric element portion 31, the electrode plate 32c arranged between the pair of piezoelectric element plates 32b and 32d of the second piezoelectric element portion 32, and the electrode plate 33c arranged between the pair of piezoelectric element plates 33b and 33d of the third piezoelectric element portion 33 are electrically connected to the driver circuit 17.

Next, description is given of the operation of the vibration actuator according to the first embodiment.

First, with respect to the vibrator 3, when an AC voltage of a frequency close to the natural frequency of the stator 2 is applied to the electrode plate 31c of the first piezoelectric element portion 31, the two-divided portions of the pair of piezoelectric element plates 31b and 31d in the first piezoelectric element portion 31 alternately repeat expansion and contraction in the Z-axial direction, and generate flexural vibrations in the Y-axial direction in the stator 2. Similarly, when an AC voltage is applied to the electrode plate 32c of the second piezoelectric element portion 32, the pair of piezoelectric element plates 32b and 32d in the second piezoelectric element portion 32 repeat expansion and contraction in the Z-axial direction, and generate longitudinal vibrations in the Z-axial direction in the stator 2. Further, when an AC voltage is applied to the electrode plate 33c of the third piezoelectric element portion 33, the two-divided portions of the pair of piezoelectric element plates 33b and 33d in the third piezoelectric element portion 33 alternately repeat expansion and contraction in the Z-axial direction, and generate flexural vibrations in the X-axial direction in the stator 2.

Therefore, for example, when AC voltages whose phases are shifted from each other by 90 degrees are applied from the driver circuit 17 to both of the electrode plate 32c of the second piezoelectric element portion 32 and the electrode plate 33c of the third piezoelectric element portion 33, the flexural vibrations in the X-axial direction and the longitudinal vibrations in the Z-axial direction are combined together to generate elliptic vibrations within the X-Z plane at the step 16 of the stator 2 that is in contact with the rotor 6. The rotor 6 then rotates about the Y-axis through an intermediation of the frictional force. In this situation, the spherical member 11 of the preload portion 10 also rotates about the Y-axis while following the rotary motion of the rotor 6.

Similarly, when AC voltages whose phases are shifted from each other by 90 degrees are applied from the driver circuit 17 to both of the electrode plate 31c of the first piezoelectric element portion 31 and the electrode plate 32c of the second piezoelectric element portion 32, the flexural vibrations in the Y-axial direction and the longitudinal vibrations in the Z-axial direction are combined together to generate elliptic vibrations within the Y-Z plane at the step 16 of the stator 2 that is in contact with the rotor 6. The rotor 6 then rotates about the X-axis through the intermediation of the frictional force. In this situation, the spherical member 11 of the preload portion 10 also rotates about the X-axis while following the rotary motion of the rotor 6.

Further, when AC voltages whose phases are shifted from each other by 90 degrees are applied from the driver circuit 17 to both of the electrode plate 31c of the first piezoelectric element portion 31 and the electrode plate 33c of the third piezoelectric element portion 33, the flexural vibrations in the X-axial direction and the flexural vibrations in the Y-axial direction are combined together to generate elliptic vibrations within the X-Y plane at the step 16 of the stator 2 that is in contact with the rotor 6. The rotor 6 then rotates about the Z-axis through the intermediation of the frictional force. In this situation, the spherical member 11 of the preload portion 10 also rotates about the Z-axis while following the rotary motion of the rotor 6.

The vibrator 3 is driven in the above-mentioned manner, thereby rotating the rotor 6 about the three axes of X, Y, and Z, which causes the output shaft 12 to be moved. However, because the top portion of the rotor 6 is preloaded by the preload portion 10, the output shaft 12 can be moved freely between the preload portion 10 and the annular portion 8 of the support member 7 as the movable range.

Also, because the top portion of the rotor 6 is preloaded through the intermediation of the spherical member 11 of the preload portion 10, even if the preload is set to be larger, the preload portion 10 does not slip out over the rotor 6. For that reason, a high-torque rotation can be realized by an increase in preload.

Because the spherical member 11 of the preload portion 10 is disposed to be rotatable about the multiple axes, the frictional loss caused by rotation of the rotor 6 is reduced. However, if the spherical member 11 of the preload portion 10 is also configured to generate elliptic vibrations in a manner similar to the stator 2 through the intermediation of the support member 7 driven by the vibrator 3, the frictional loss required for preload can be reduced further.

Also, if the spherical member 11 of the preload portion 10 is vibrated in the same vibration mode as that of the stator 2 to generate the driving force in the same direction as that of the stator 2, the rotating force is transmitted to the rotor 6 from both the stator 2 and the preload portion 10, thereby enabling high-torque rotation.

Second Embodiment

Figure 5:
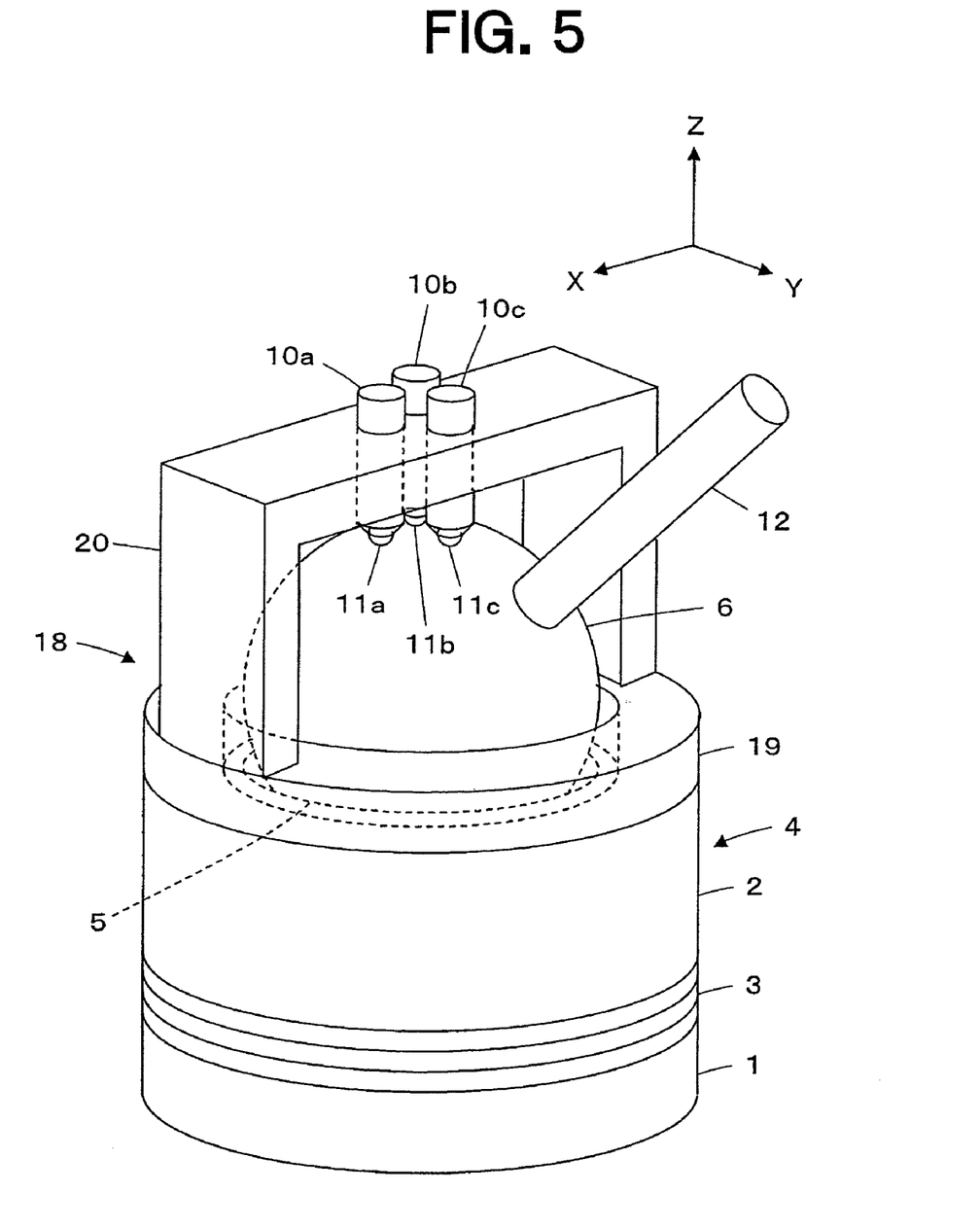
FIG. 5 is a perspective view illustrating a vibration actuator according to a second embodiment.

FIG. 5 illustrates a vibration actuator according to a second embodiment of the present invention. In the second embodiment, in the vibration actuator according to the first embodiment illustrated in FIG. 1, instead of the support member 7 that supports the preload portion 10, a support member 18 is so configured as to support three preload portions 10a, 10b, and 10c. The support member 18 has an annular portion 19 fixed on a top surface of the stator 2. An arch portion 20 integrated with the annular portion 19 so as to straddle the rotor 6. The three preload portions 10a, 10b, and 10c are supported in the substantial center of the arch portion 20. Those preload portions 10a, 10b, and 10c have respective spherical members 11a, 11b, and 11c that abut against the top portion of the rotor 6, and are rotatable about multiple axes. The arch portion 20 of the support member 18 has elasticity which allows the spherical members 11a, 11b, and 11c to be brought into pressure contact with the rotor 6, thereby preloading the rotor 6 in the −Z axial direction.

Even with the above-mentioned configuration, as in the first embodiment, the output shaft 12 of the rotor 6 can be moved freely between the preload portions 10a, 10b, and 10c, and the annular portion 19 of the support member 18 as the movable range.

Third Embodiment

Figure 6:
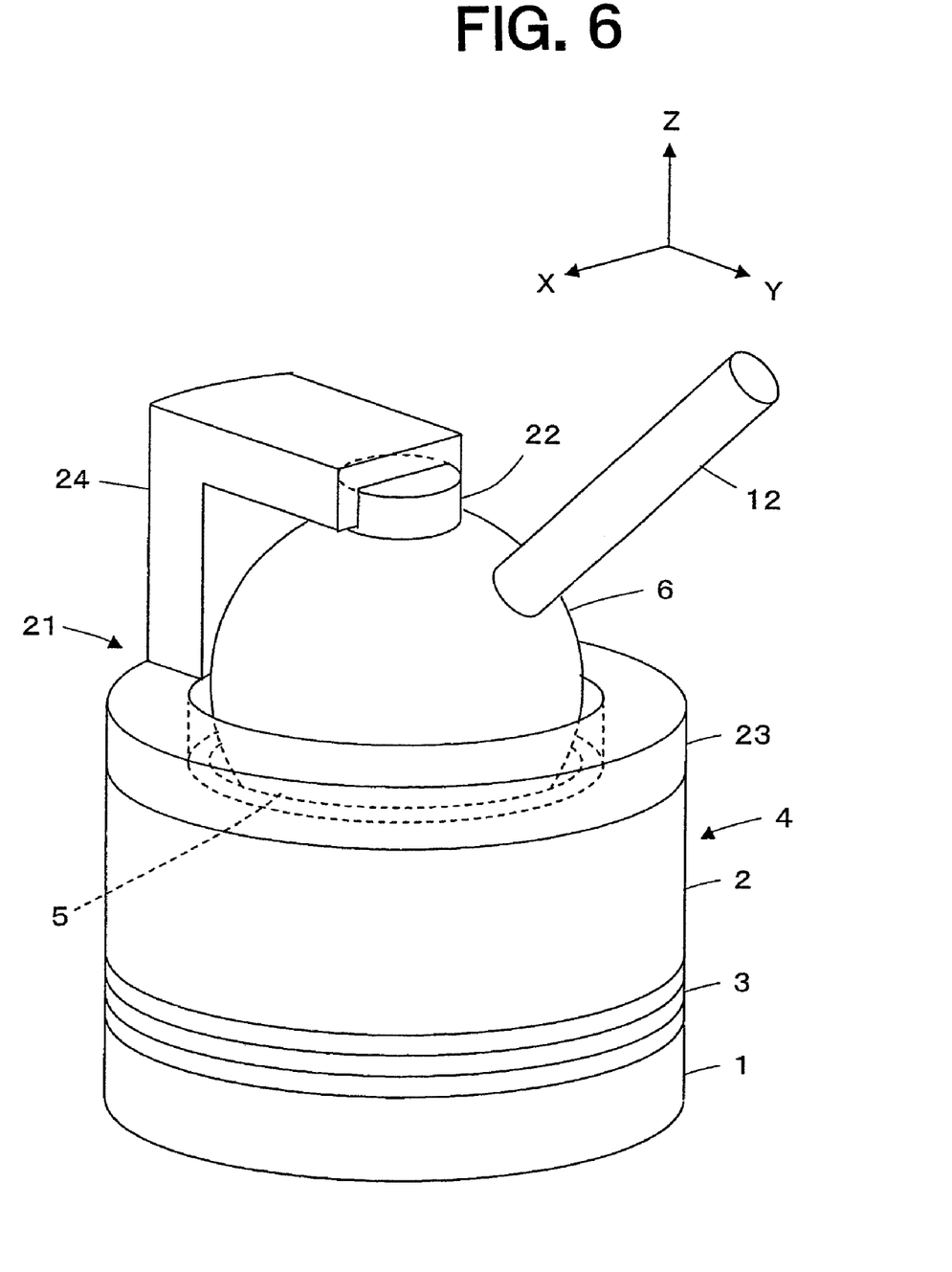
FIG. 6 is a perspective view illustrating a vibration actuator according to a third embodiment.
Figure 7:
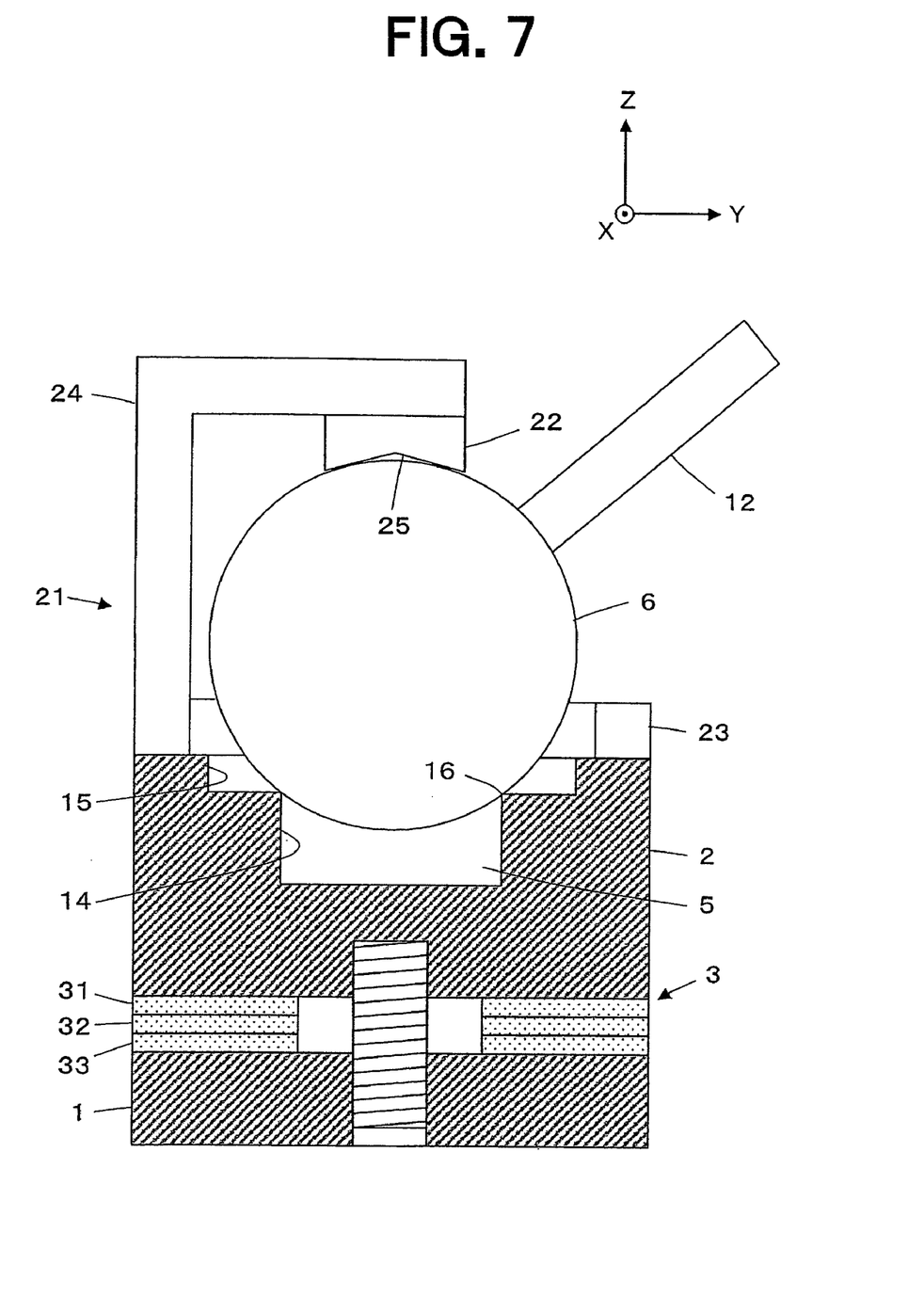
FIG. 7 is a cross-sectional view illustrating the vibration actuator according to the third embodiment.

FIG. 6 illustrates a vibration actuator according to a third embodiment of the present invention. According to the third embodiment, in the vibration actuator of the first embodiment illustrated in FIG. 1, instead of the preload portion 10 being supported by the support member 7, a preload portion 22 is supported by a support member 21. The support member 21 includes an annular portion 23 fixed onto a top surface of the stator 2, and a reverse L-shaped angle portion 24 extending upward from the annular portion 23. The preload portion 22 is supported at the end of the angle portion 24. As illustrated in FIG. 7, the preload portion 22 has a preload surface 25 of a recessed conical surface shape, and the preload surface 25 is in contact with the top portion of the rotor 6.

The angle portion 24 of the support member 21 has elasticity, which allows the preload surface 25 of the preload portion 22 to be brought into pressure contact with the rotor 6, thereby preloading the rotor 6 in the −Z axial direction.

By using the preload surface 25 of the recessed conical surface shape described above, the preload surface 25 comes into contact with the top portion of the substantially spherical rotor 6 more easily.

Figure 8:
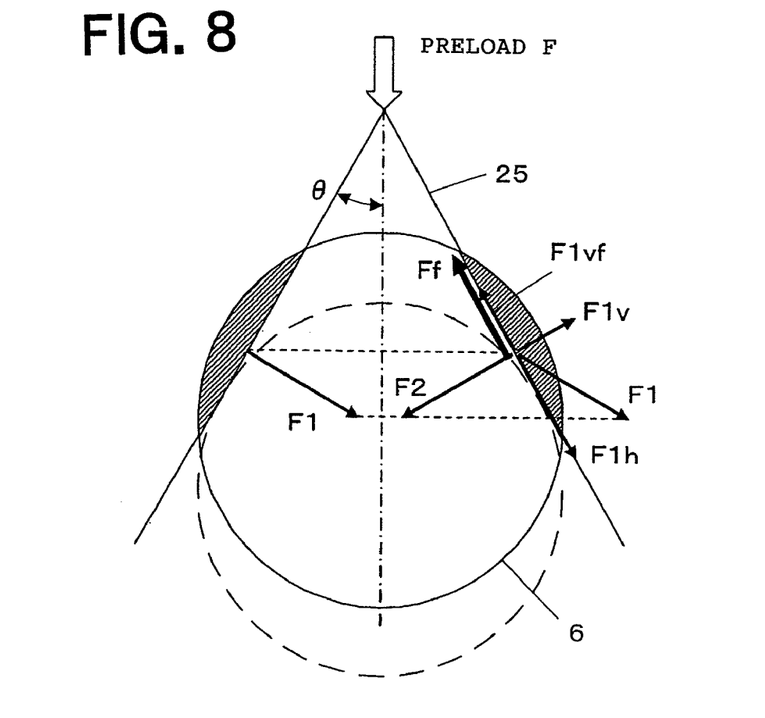
FIG. 8 is a cross-sectional view illustrating a relationship between a preload surface of a preload portion and a rotor in the third embodiment.

In this situation, as illustrated in FIG. 8, in the case where the preload surface 25 of the recessed conical surface shape has an angle θ smaller than 45 degrees with respect to the center line, if the rotor 6 is pressured by the preload surface 25 with a preload F, the rotor 6 and the preload portion 22 deform together (hatched portions). Assuming that those deformations are uniform, the contact cross-section is circular and forces F1 and F2 exerted on the rotor 6 are generated by the preload portion 22. These forces F1 and F2 are held continuously while the deformations are maintained to some degree. The forces F1 and F2 are forces by which the rotor 6 is pressed against a surface opposite to the contact surface. For example, with the force F1 being applied, the rotor 6 is pressed by the force F1 against the opposite surface. A frictional force F1*vf* is exerted between the rotor 6 and the preload surface 25 in correspondence with a vertical partial force component F1v of the force F1. Also, a horizontal partial force component F1h of the force F1 along a conical surface A becomes a force for pulling the rotor 6 out of the preload surface 25. Further, regardless of the deformation of the rotor 6 and the preload portion 22, a frictional force Ff is exerted between the rotor 6 and the preload surface 25 due to the preload F.

Therefore, if the pull force F1h is smaller than the frictional force (F1vf+Ff), the rotor 6 cannot be pulled out of the preload surface 25, and is embedded thereinto.

Figure 9:
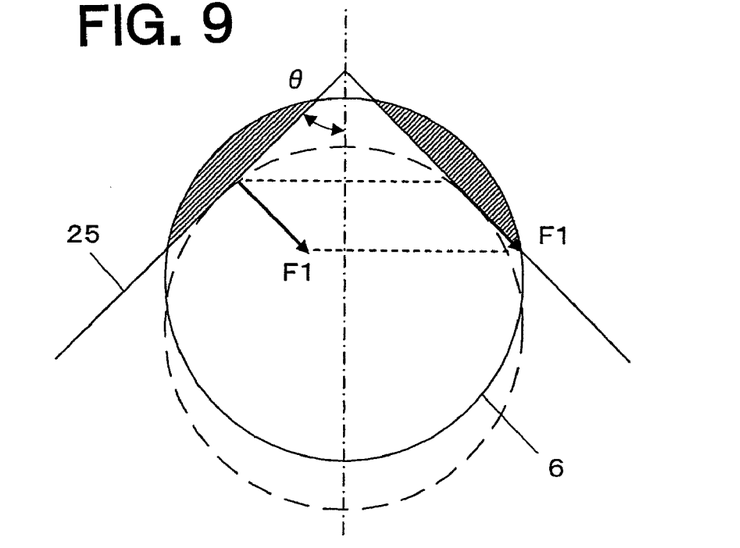
FIG. 9 is a cross-sectional view illustrating a relationship between the preload surface of the preload portion and the rotor in the third embodiment.

On the other hand, if the preload surface 25 of the recessed conical surface shape has an angle θ of 45 degrees with respect to the center line, as illustrated in FIG. 9, the force F1 exerted on the rotor 6 from the preload portion 22 has a direction along a surface opposite to the contact surface. Therefore, the vertical partial force component becomes 0, and none of the frictional force F1vf described above accompanying the deformations is generated. Likewise, if the angle θ with respect to the center line of the preload surface 25 of the recessed conical surface shape exceeds 45 degrees, no frictional force F1vf is generated. Accordingly, no binding of the rotor 6 caused by the deformations of the rotor 6 and the preload portion 22 occur.

That is, it is preferable that the preload surface 25 having the recessed conical surface shape of the preload portion 22 have an angle θ that is equal to or larger than 45 degrees with respect to the center line.

Fourth Embodiment

Figure 10:
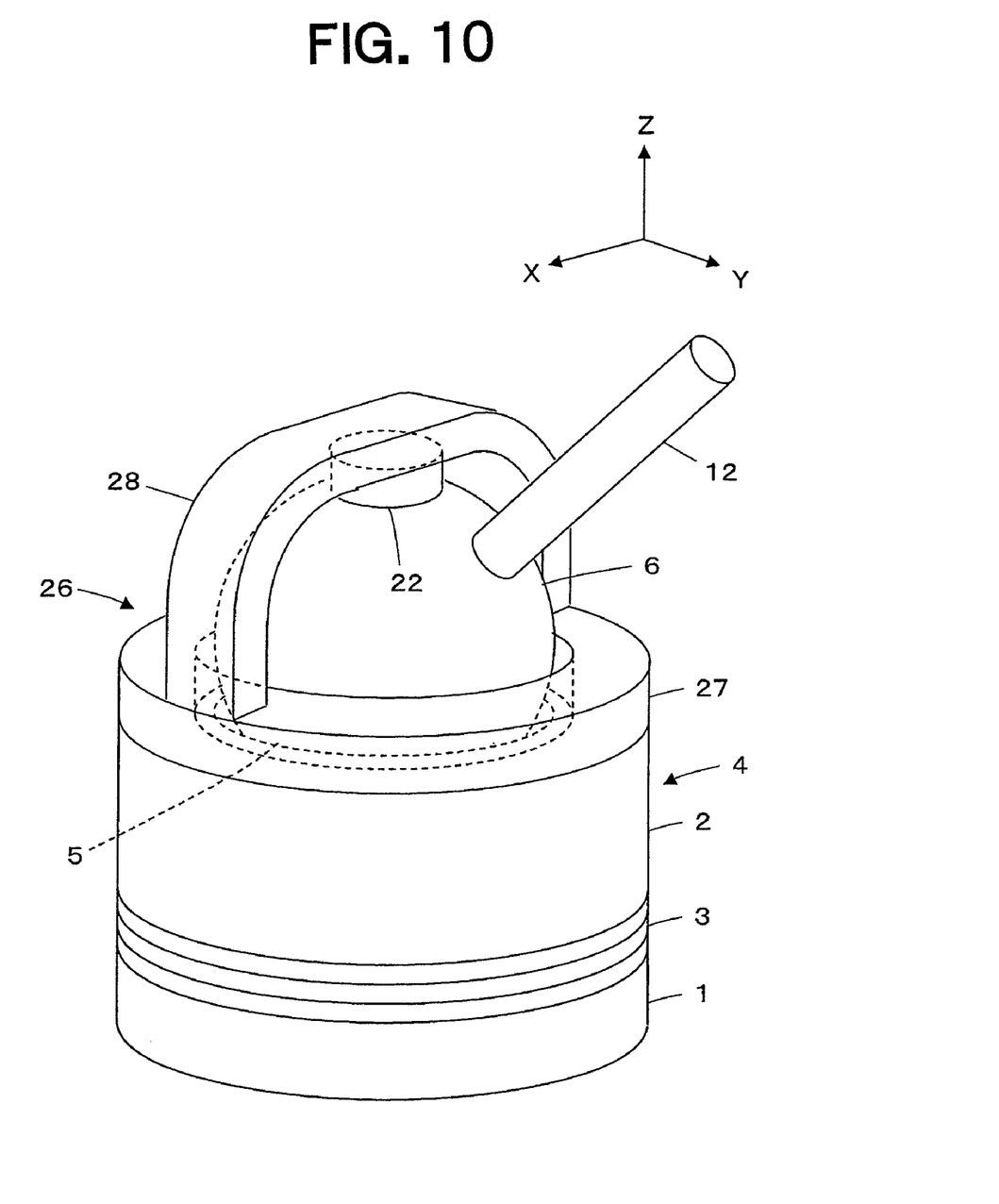
FIG. 10 is a perspective view illustrating a vibration actuator according to a fourth embodiment.

FIG. 10 illustrates a vibration actuator according to a fourth embodiment of the present invention. According to the fourth embodiment, in the vibration actuator of the third embodiment illustrated in FIG. 6, instead of the support member 21, the preload portion 22 is supported by a support member 26. The support member 26 includes an annular portion 27 fixed onto a top surface of the stator 2, and an arch portion 28 integrated with the annular portion 27. The preload portion 22 is supported by the arch portion 28.

Even with the above-mentioned configuration, as in the third embodiment, the output shaft 12 of the rotor 6 can be moved freely between the preload portion 22 and the annular portion 27 of the support member 26 as the movable range.

Fifth Embodiment

Figure 11:
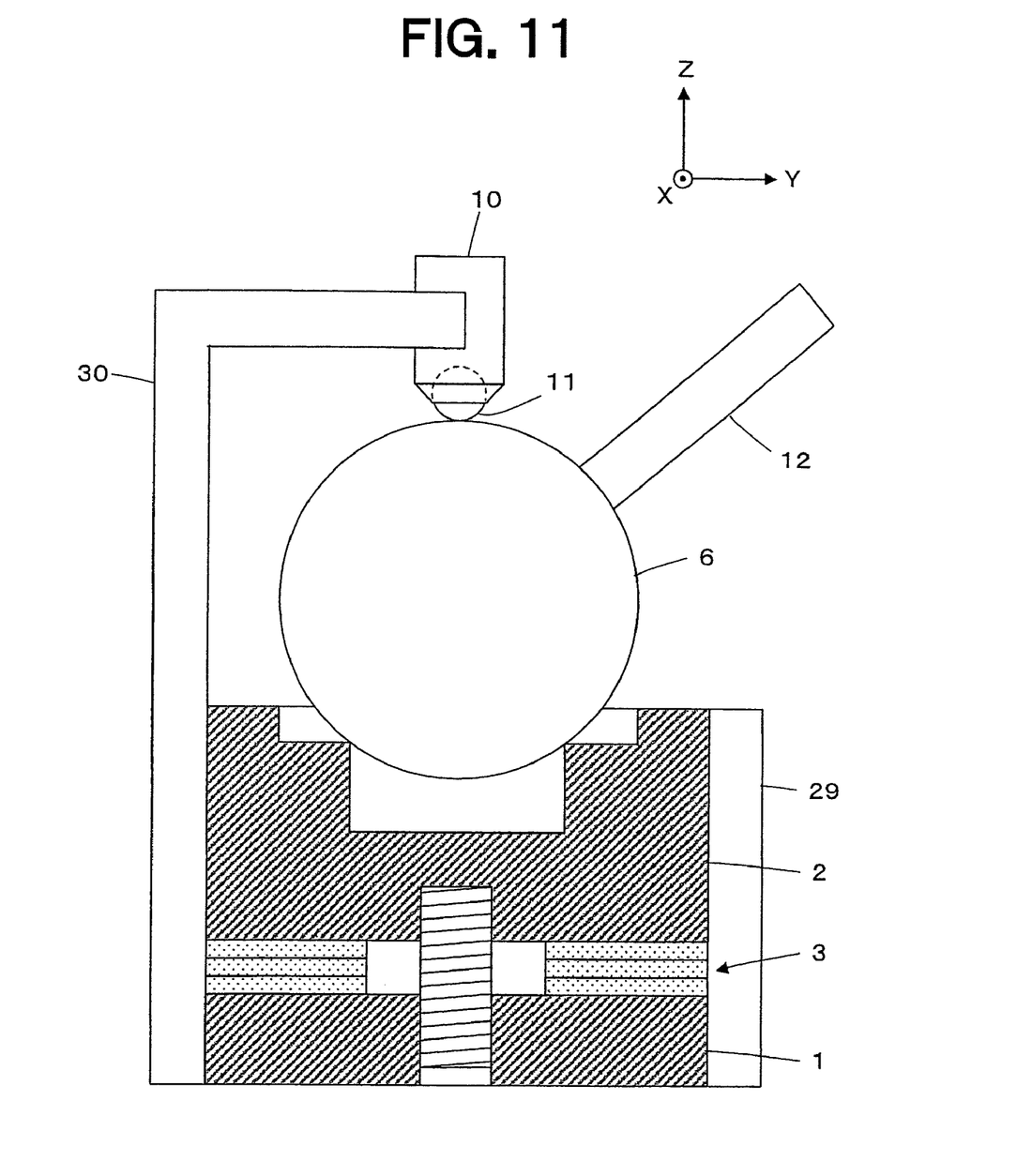
FIG. 11 is a cross-sectional view illustrating a vibration actuator according to a fifth embodiment.

FIG. 11 illustrates a vibration actuator according to a fifth embodiment of the present invention. According to the fifth embodiment, in the vibration actuator of the first embodiment illustrated in FIG. 1, the base block 1, the stator 2, and the vibrator 3 are housed within a cylindrical casing 29, a reverse L-shaped angle portion (cantilever portion) 30 extending upward is formed integral with the casing 29, and the preload portion 10 is supported at the end of the angle portion 30.

That is, in the fifth embodiment, the preload portion 10 is supported with respect to the casing 29 independent of the vibration system including the base block 1, the stator 2, and the vibrator 3.

Even with the above-mentioned configuration, the output shaft 12 of the rotor 6 can be moved freely between the preload portion 10 and the stator 2 as the movable range.

Figure 12:
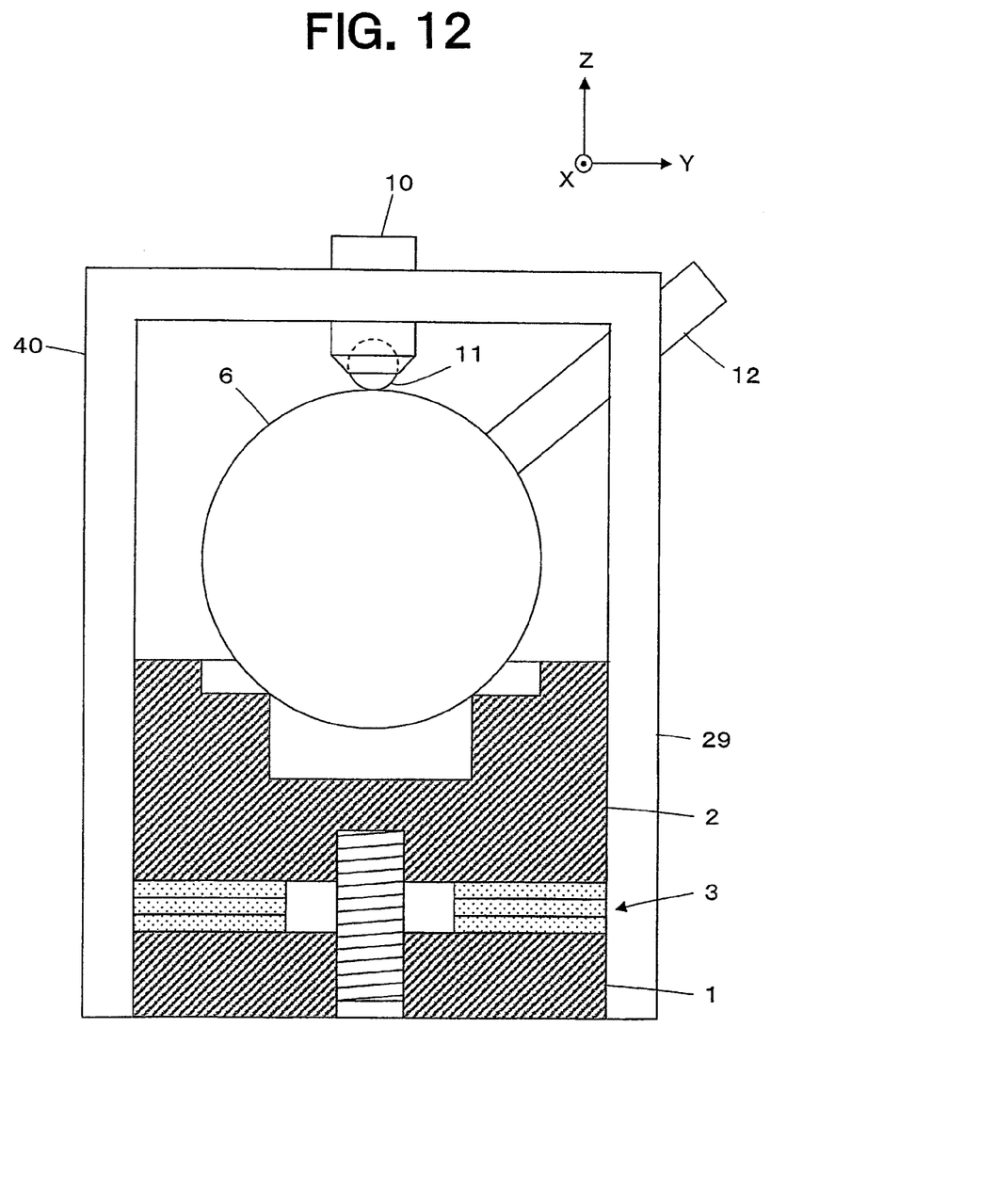
FIG. 12 is a cross-sectional view illustrating a vibration actuator according to an alternative example of the fifth embodiment.

Likewise, as illustrated in FIG. 12, an arch portion 40 straddling the rotor 6 may be integrated with the cylindrical casing 29 that houses the base block 1, the stator 2, and the vibrator 3 so that the preload portion 10 can be arranged in the substantial center of the arch portion 40.

Further, the fifth embodiment may be applied to the second to fourth embodiments respectively, such that the preload portions 10a, 10b, and 10c, or 22 are supported with respect to the casing 29 independent of the vibration system.

Sixth Embodiment

Figure 13:
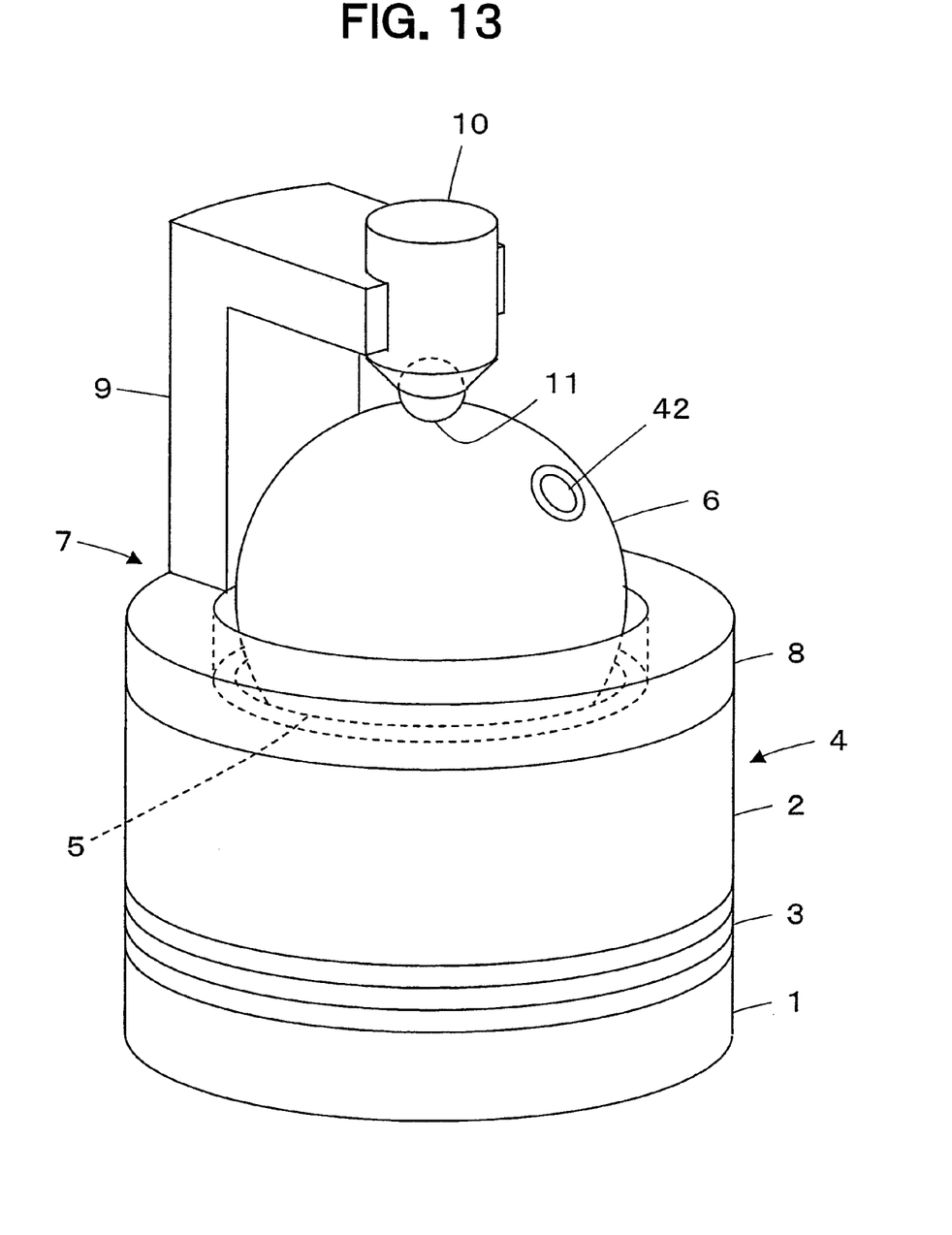
FIG. 13 is a cross-sectional view illustrating a vibration actuator according to a sixth embodiment.

FIG. 13 illustrates a vibration actuator according to a sixth embodiment of the present invention. According to the sixth embodiment, in the vibration actuator according to the first embodiment illustrated in FIG. 1, instead of the output shaft 12, a built-in camera 42 is equipped in the rotor 6 as a functional component. With the movement of the rotor 6, a lens portion of the built-in camera 42 can be moved freely between the preload portion 10 and the stator 2 for photographing.

Likewise, the sixth embodiment can be applied to the second to fifth embodiments respectively, so as to move the built-in camera 42.

Further, various functional components other than the output shaft 12 and the built-in camera 42 may be provided in the rotor 6.

In the above-mentioned first to sixth embodiments, if the spherical member 11 of the preload portion 10, the spherical members 11a, 11b, and 11c of the preload portions 10a, 10b, and 10c, and the preload surface 25 of the preload portion 22, which are in contact with the top portion of the rotor 6, are made of a low frictional material such as Teflon (registered trademark), it is possible to reduce the frictional loss necessary for preload.

The invention claimed is:

1. A vibration actuator, comprising:
   a stator;
   a rotor of a substantially spherical shape which is disposed on the stator;
   preload means for bringing the rotor into pressure contact with the stator; and
   vibrating means for generating ultrasonic vibrations in the stator so as to rotate the rotor, wherein:
   the rotor comprises a functional component;
   the preload means comprises a preload portion that abuts against a top portion of the rotor and preloads the top portion; and
   the functional component of the rotor is moved between the preload portion and the stator as a movable range.

2. A vibration actuator according to claim 1, wherein the preload portion comprises at least one spherical member that is rotatable about multiple axes and in contact with a surface of the rotor.

3. A vibration actuator according to claim 2, wherein the preload portion comprises a plurality of the spherical members.

4. A vibration actuator according to claim 1, wherein the preload portion comprises a preload surface of a recessed conical surface shape, which is in contact with a surface of the rotor.

5. A vibration actuator according to claim 1, wherein the preload means comprises a support member for supporting the preload portion with respect to the stator.

6. A vibration actuator according to claim 5, wherein the vibrating means also generates the ultrasonic vibrations in the preload portion.

7. A vibration actuator according to claim 5, wherein:
   the support member comprises a cantilever portion; and
   the preload portion is arranged at an end of the cantilever portion.

8. A vibration actuator according to claim 5, wherein:
the support member comprises an arch portion that straddles the rotor; and
the preload portion is arranged in a substantial center of the arch portion.

9. A vibration actuator according to claim 1, wherein the preload means comprises a support member for supporting the preload portion independently of the stator.

10. A vibration actuator according to claim 9, wherein:
the support member comprises a cantilever portion; and
the preload portion is arranged at an end of the cantilever portion.

11. A vibration actuator according to claim 9, wherein:
the support member comprises an arch portion that straddles the rotor; and
the preload portion is arranged in a substantial center of the arch portion.

12. A vibration actuator according to claim 1, wherein the functional component is an output shaft fixed to the rotor.

13. A vibration actuator according to claim 1, wherein the functional component is a camera built in the rotor.

* * * * *